United States Patent [19]

McShane et al.

[11] Patent Number: 5,777,753
[45] Date of Patent: Jul. 7, 1998

[54] METHOD AND APPARATUS FOR MAXIMIZING THE NUMBER OF RADIOLOGICAL IMAGES PRINTED ON SHEET OF FILM

[75] Inventors: James F. McShane, Kennett Square; Bruce T. Robinson, Telford, both of Pa.

[73] Assignee: Axsys Corporation, Greenville, Del.

[21] Appl. No.: 932,460

[22] Filed: Sep. 18, 1997

Related U.S. Application Data

[63] Continuation of Ser. No. 602,352, Feb. 16, 1996, abandoned.

[51] Int. Cl.$^6$ .................. H04N 1/23; H04N 1/387; G06K 9/36
[52] U.S. Cl. .................. 358/302; 358/450; 382/132
[58] Field of Search ................. 358/296, 302, 358/400, 401, 448, 450–453, 464; 355/54; 382/132; 395/102, 112

[56] References Cited

U.S. PATENT DOCUMENTS

| | | | |
|---|---|---|---|
| 4,075,700 | 2/1978 | Blay | 364/515 |
| 5,014,198 | 5/1991 | Umemura | 364/413.13 |
| 5,051,843 | 9/1991 | Hayashi | 358/450 |
| 5,123,056 | 6/1992 | Wilson | 382/132 |
| 5,144,452 | 9/1992 | Abuyama | 358/296 |
| 5,146,343 | 9/1992 | Fujii | 358/296 |
| 5,150,427 | 9/1992 | Frazee et al. | 382/48 |
| 5,172,419 | 12/1992 | Manian | 382/132 |
| 5,191,429 | 3/1993 | Rourke | 358/296 |
| 5,241,472 | 8/1993 | Gur et al. | 364/413.22 |
| 5,440,403 | 8/1995 | Hasimoto et al. | 358/450 X |
| 5,452,416 | 9/1995 | Hilton et al. | 364/413.22 X |
| 5,475,475 | 12/1995 | Kohtani et al. | 358/450 X |
| 5,576,848 | 11/1996 | Kusano et al. | 358/450 X |

*Primary Examiner*—Eric Frahm
*Attorney, Agent, or Firm*—Finnegan, Henderson, Farabow, Garrett, & Dunner, L.L.P.

[57] ABSTRACT

An apparatus and method is provided for maximizing the number of digital radiological images displayed on a single sheet of film. Digital radiological frames, including radiological images and non-image portions, produced by a computer tomography device, a magnetic resonance imaging device, an ultra device or other radiological equipment are first stored. The radiological image portion of the frames are then identified and the non-image portion of the frames are reduced, producing a modified radiological frames. Finally, the modified radiological frames are arranged relative to one another in an area corresponding to the area of a sheet of film and printed on a sheet of film.

3 Claims, 15 Drawing Sheets

METHOD AND APPARATUS FOR MAXIMIZING THE NUMBER OF RADIOLOGICAL IMAGES PRINTED ON SHEET OF FILM

This is a continuation of application Ser. No. 08/602,352, filed Feb. 16,1996, now abandoned.

BACKGROUND OF THE INVENTION

A. Field of the Invention

The present invention relates to a method and apparatus for printing digital radiological frames on a sheet of film. The radiological frames may be from a computed tomography device, a magnetic resonance imaging device, an ultrasound device, a nuclear medicine imaging device or other radiological equipment producing digital radiological frames.

B. Description of the Related Art

Conventional radiological equipment print multiple frames acquired in a radiological study onto one or more sheets of film. Typically, radiological equipment have a video output signal. This video output signal may be used directly to print the multiple radiological frames or may be digitized prior to being forwarded to a printer or other display means.

Regardless of how the sheet of film may have been printed, each sheet of film typically includes more than a single radiological frame. A large portion of each frame is either blank or contains redundant information associated with the images. Because a large portion of each film sheet is blank or contains redundant information, a large number of film sheets are necessary to display a complete radiological study. Thus, a large amount of film is used for each radiological study. The film sheets are expensive and the film costs add to the overall costs of the radiological study itself. Moreover, for a medical provider the overall costs of storing large amounts of film can also be great.

By arranging more frames on a single film sheet, the number of film sheets needed for a particular radiological study can be reduced, thus reducing the costs of a radiological study. More frames can be arranged on a single sheet of film if each radiological frame is proportionally reduced. Proportionally reducing the size of a radiological frame means printing the entire radiological frame in a smaller size. This method of increasing the number of radiological frames printed on a single sheet of film has an important disadvantage. Proportional reduction of radiological frames reduces the size of the medical image displayed on the frame, which reduces the detail available on the image and thereby diminishes the usefulness of the image to the medical practitioner.

In the related art of teleradiology, more radiological frames have been displayed on a display screen by "cropping" each frame. The term cropping refers to maintaining the medical image size while reducing the physical dimension of each frame by eliminating portions of the frame.

Two methods of cropping are known in the art. Blind cropping involves presetting the frame dimensions without regard to the image displayed on the frame. With manual masking, the operator of the radiological equipment considers each frame and determines manually where the frame will be cropped.

With blind cropping, while the medical image size is maintained, the physical cropped dimensions are preset irregardless of the size or position of the medical image on any particular radiological frame, making it is possible that the entire medical image may not be displayed on a blind cropped frame. Again, the usefulness of the frame, or perhaps entire study, to the medical practitioner may be reduced.

With manual cropping, the medical image size is maintained and an operator controls exactly where each frame will be cropped as it is generated. Manual cropping thus ensures that the medical image size remains large enough to be useful to the medical practitioner and portions of the medical image displayed on the radiological frame are not cropped off. Manual cropping, however, involves intense manual operator input and is thus time consuming and operator dependent.

In light of the foregoing, there is a need for an apparatus and method of increasing the number of radiological frames printed on a single sheet of film that will not reduce the size of the medical image so as to diminish the usefulness of the medical image and would not risk eliminating part of the medical image nor is time consuming and operator dependent.

SUMMARY OF THE INVENTION

Accordingly, the present invention is directed to an apparatus and a method that substantially obviates one or more of the problems due to the limitations and disadvantages of the related art. The present invention is directed to an apparatus and method that increases the number of radiological images printed on a single sheet of film without necessitating reducing the size of the radiological images, or risking elimination of part of any radiological image, or is time consuming and operator dependent.

Additional features and advantages of the invention will be set forth in the description which follows, and in part will be apparent from the description, or may be learned by practice of the invention. The objectives and other advantages of the invention will be realized and attained by the apparatus and methods particularly pointed out in the written description and claims hereof as well as the appended drawings.

To achieve these and other advantages and in accordance with the purpose of the invention, as embodied and broadly described, the invention includes a means for serially storing a plurality of digital radiological frames made up of digital information, with each radiological frame having an image portion and a non-image portion. The invention further includes a means for identifying the radiological image portion of each of the stored radiological frames and a means for reducing the non-image portion of each of the stored radiological frames so as to create a plurality of modified radiological frames. The invention further includes a means for arranging the plurality of modified radiological frames relative to one another into a plurality of rows and columns which occupy a predetermined area corresponding to the area of a sheet of film onto which the modified radiological frames may be printed.

In another aspect, the invention includes an apparatus for maximizing the number of radiological images printed on a sheet of film wherein the means for serially storing the plurality of digital radiological frames includes a computer memory, and wherein the means for identifying the radiological portion of each stored digital frame and the means for reducing the non-image portion of each stored radiological frame includes a central processing unit and wherein the means for arranging the modified radiological frames includes a central processing unit and a computer memory.

In another aspect, the invention includes a method of maximizing the number of radiological images printed on a sheet of film by serially storing a plurality of digital radiological frames with each frame having an image portion and a non-image portion; identifying the radiological image portion of the stored, radiological frames; reducing the non-image portion of each stored digital radiological frame thus creating a plurality of modified radiological frames; arranging the plurality of modified radiological frames relative to one another into a plurality of rows and columns of modified radiological frames occupying a predetermined area corresponding to the area of a sheet of film onto which the modified radiological frames may be printed. Finally, the plurality of modified radiological prints may be printed or otherwise outputted.

In another aspect, the invention includes a method of identifying the image portion of each plurality of stored digital radiological frames by determining the outer boundaries of each plurality of stored digital radiological frames and analyzing line by line the digital information parallel to each of the outer boundaries of each plurality of stored digital radiological frames until the radiological image is detected.

In another aspect, the invention includes a method of reducing the non-image portion of each plurality of stored digital radiological frames by realigning one or more of the outer boundaries of each of the plurality of stored digital radiological frames such that the outer boundary is closer to the image portion of each of the plurality of stored digital radiological frames.

In another aspect, the invention includes removing redundant information from the plurality of digital radiological frames.

In another aspect, the invention includes reducing the non-image portion of each of the digital radiological frames such that all of the plurality of modified radiological frames arranged relative to one another into a plurality of rows and columns occupying a predetermined area corresponding to the area of a sheet of film onto which the radiological frames may be printed, have the same length and width.

In another aspect, the invention includes reducing the non-image portion of each radiological frame such that all of the plurality of modified radiological frames arranged relative to one another into a plurality of rows and columns occupying a predetermined area corresponding to the area of a sheet of film onto which the radiological frames may be printed have the same width and wherein each of the plurality of modified radiological frames in a row have the same length.

In another aspect, the invention includes reducing the non-image portion of each of the digital radiological frames such that all of the plurality of modified radiological frames arranged relative to one another in a row have the same width and the same length.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

DESCRIPTION OF THE PREFERRED EMBODIMENTS

Reference will now be made in detail to the present preferred embodiments of the invention, an example of which is illustrated in the accompanying drawings. Wherever possible, the same reference numbers will be used throughout the drawings to refer to the same or like parts.

Figure 3:
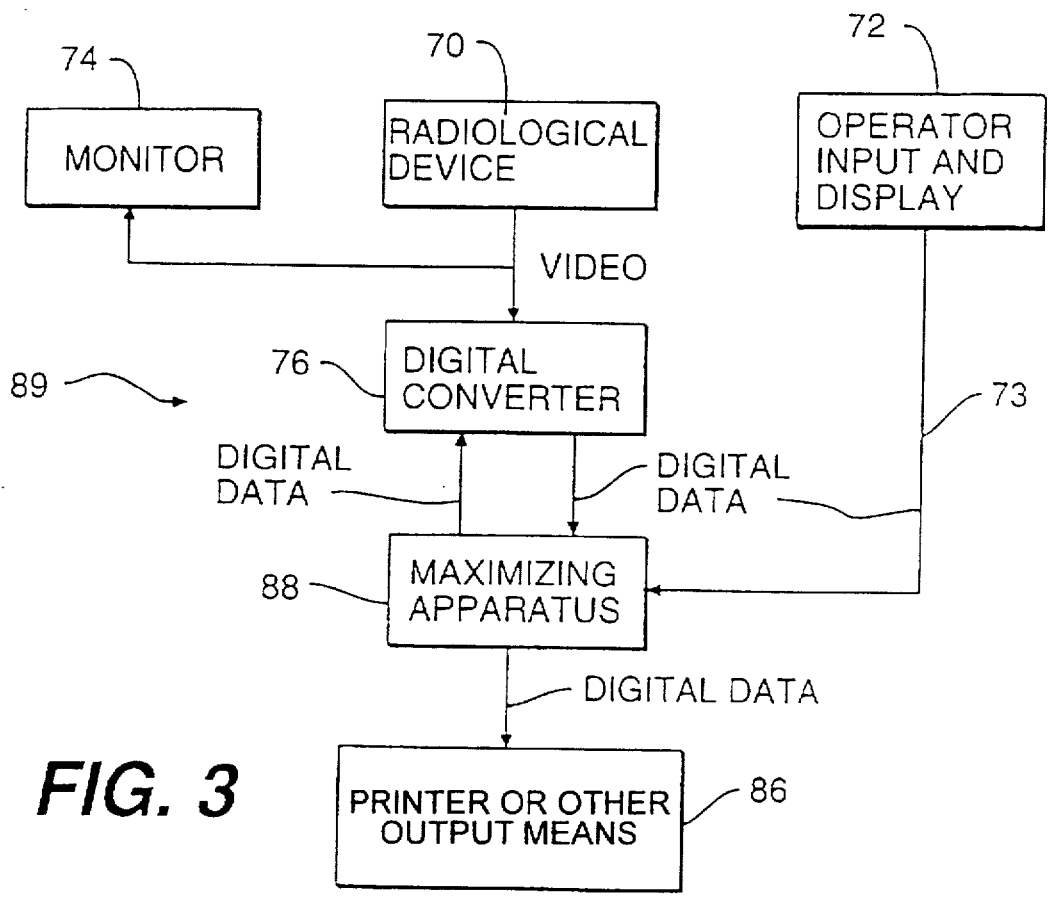
FIG. 3 is a block diagram of a system for producing and printing or otherwise outputting radiological images incorporating the present invention.
Figure 4:
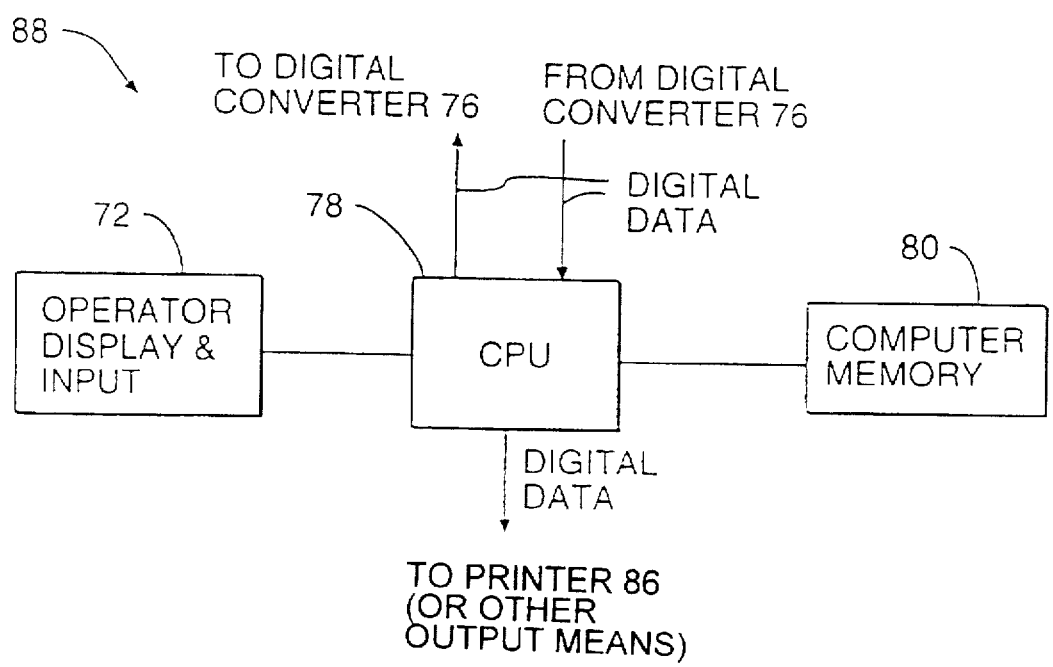
FIG. 4 is a block diagram of an apparatus for maximizing the number of radiological images printed on a sheet of film according to the present invention.

The exemplary embodiment of the apparatus for maximizing the number of radiological images printed on a sheet of film of the present invention is shown in FIG. 4 and is designated generally by the reference numeral 88. The apparatus for maximizing the number of radiological images printed on a sheet of film, 88, is part of a larger system for generating and printing or otherwise outputting radiological images shown in FIG. 3 and designated by the reference numeral 89.

This larger system includes a radiological device 70 which produces a video radiological image. The video radiological image produced by the radiological device 70 is outputted to a monitor 74 and a digital converter 76.

During operation of the radiological system 89, an operator views the radiological image on the monitor 74 and decides which image being produced by the radiological device 70 should be saved for further processing. The operator inputs this decision through the operator input and display 72. The operator input signal 73 is fed into the maximizing apparatus 88 which then activates the digital converter 76. Accordingly, the video image fed into the digital converter 76 is converted from video to digital data. This digital data creates a digital radiological frame having an image and non-image portion.

In an alternative embodiment of system 89, the radiological device 70 may fed digital data directly into the maximizing apparatus 88.

In the system embodiment 89 shown in FIG. 3, however, the digital data from the digital converter 76 is then fed into the apparatus for maximizing the number of radiological images printed on a sheet of film 88. The maximizing apparatus then stores the digital data from the digital converter 76 such that a plurality of radiological frames are serially stored. The maximizing apparatus 88 processes the digital data identifying the non-image portion of the plurality of serially stored digital radiological so as to maximize the number of radiological images which may print on a sheet of film. The maximizing apparatus 88 then outputs the processed digital data to a printer or other output means 86.

As embodied herein and referring to FIG. 4 the apparatus for maximizing the number of radiological images printed on a sheet of film includes a computer memory 80 for serially storing a plurality of digital radiological frames, a CPU 78 for identifying the radiological image portion of the stored digital radiological frames, and the computer memory 80 for, in conjunction with the CPU 78, reducing the non-image portion of the radiological frames creating a plurality of modified radiological frames and arranging the plurality of modified radiological frames into a plurality of rows and columns occupying a predetermined area corresponding to the area of a sheet of film. After the non-image portion of the radiological frames is reduced and the frames are arranged, the digital data is outputted from the CPU 78 to a printer or other output means 86.

Figure 1:
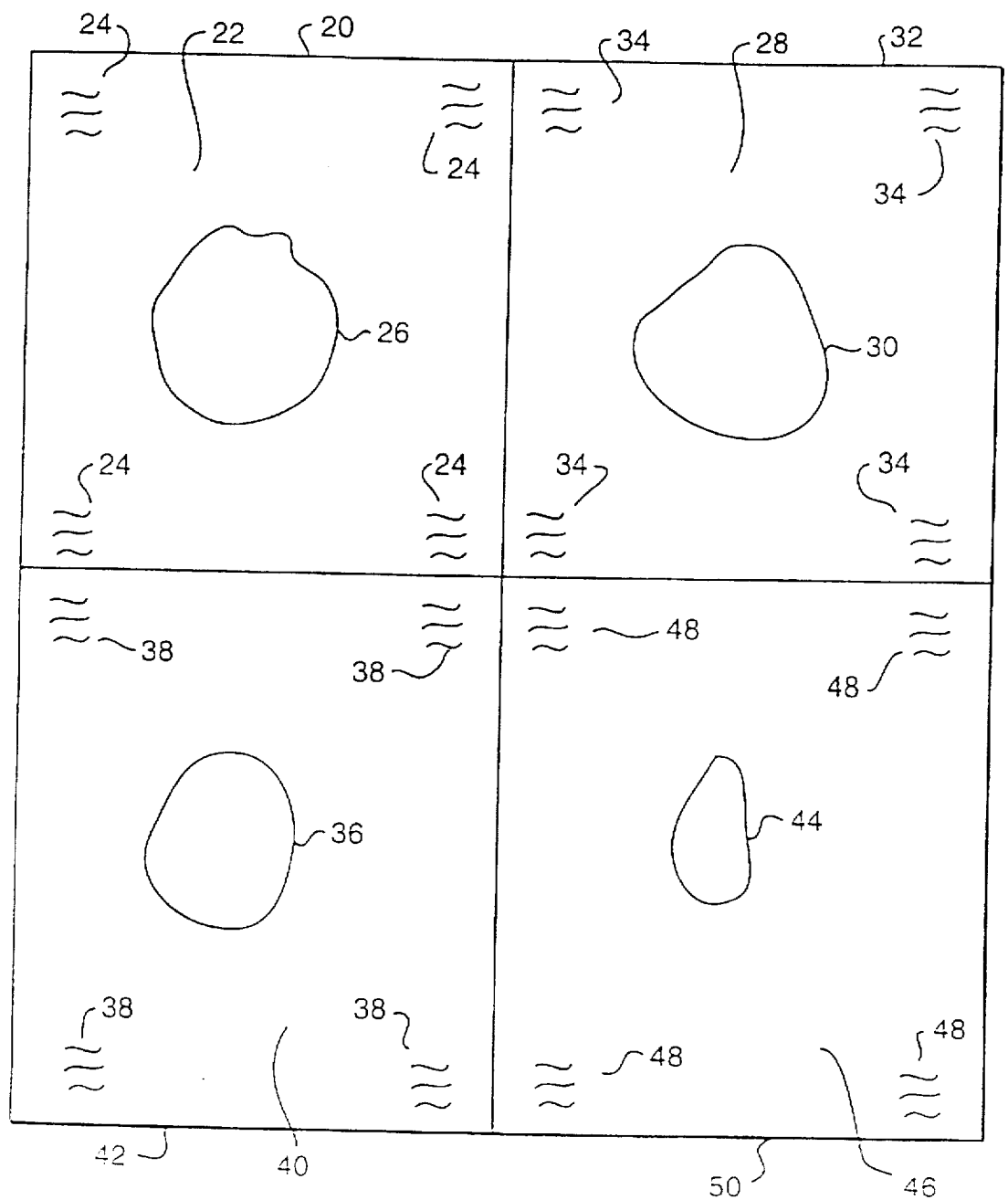
FIG. 1 is a schematic view of multiple frames of a computed tomography head study arranged on a single sheet of film without the benefit of the present invention.

Multiple frames of a computed tomography study arranged on a, single sheet of film without the benefit of the present invention is shown schematically in FIG. 1. The frames depicted on the single sheet of film in FIG. 1, 20, 32, 42, 50 each consist of an image 26, 30, 36, 40 and a non-image portion 22, 28, 40, 46. The non-image portions 22, 28, 40, 46 include redundant information associated with the images 26, 30, 36, 40 such as textual portions 24, 34, 38, 44.

Figure 2:
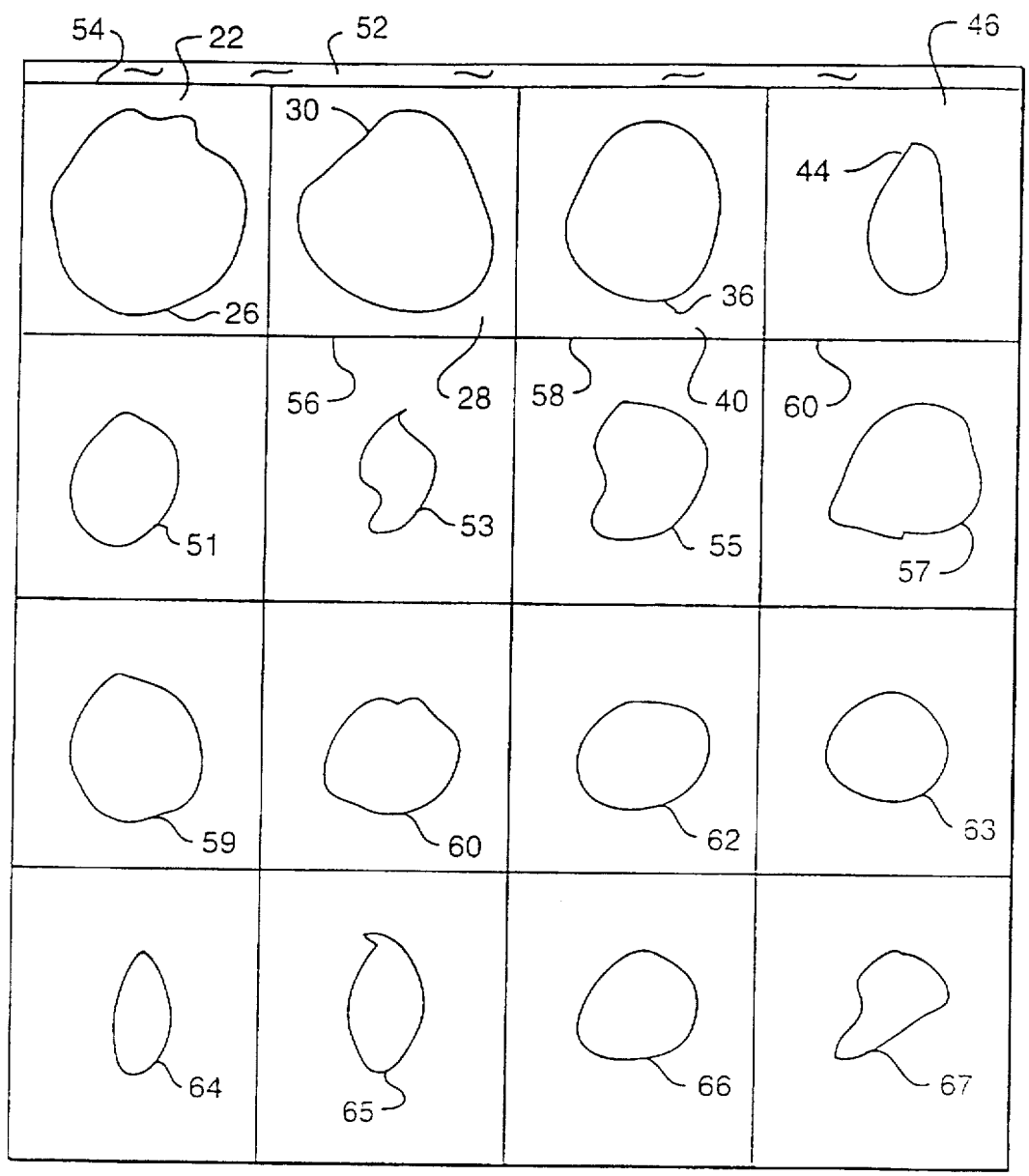
FIG. 2 is a schematic view of multiple frames of a computed tomography head study arranged on a single sheet of film with the benefit of the present invention.

The same computed tomography study depicted in FIG. 1 is shown in FIG. 2 arranged on a single sheet of film with the benefit of the present invention. As can be seen, more radiological frames are included on the single sheet of film shown, in FIG. 2. Frames 20, 32, 42, 50 have been modified into modified frames 54, 56, 58, 60. Each of these modified frames, 54, 56, 58, 60 include the images 26, 30, 36, 44, but the non-image portions 22, 28, 40, 46 have been reduced. Moreover, the redundant portions of the textural portions 24, 34, 38, 44 have been combined and modified to produce a new textural portion 52. Alternately, the new textual portion 52 could be displayed elsewhere on the film sheet. For example, in the area of modified radiological frame 54 shown in FIG. 2.

Regardless of where the new textual portion 52 is displayed, comparing FIGS. 1 and 2 make clear that more images can be arranged on a single sheet of film with the benefit of the present invention. In particular, in FIG. 2, with the benefit of the present invention, images 26, 30, 36, 44, 51, 53, 55, 57, 59, 61, 62, 63, 64, 65, 66, and 67 are arranged on the same film sheet area onto to which only FIGS. 26, 30, 36, 44 are arranged in FIG. 1 without the benefit of the present invention. Even if the new textual portion 52 were to be displayed where the modified frame 54 is shown in FIG. 2, additional images 51, 53, 55, 57, 59, 61, 62, 63, 64, 65, and 66 would be arranged on the same film sheet area as shown in FIG. 1.

In practice, the modified and unmodified radiological frames are arranged on a radiological film sheet with border spacing between the radiological frames and at the top, bottom and sides of the radiological film sheet. Typically, the film sheet size, as well as the borders and spacings, are measured in physical dimensions (e.g., inches), whereas the modified or unmodified radiological frames are measured in pixels.

Figure 5A:
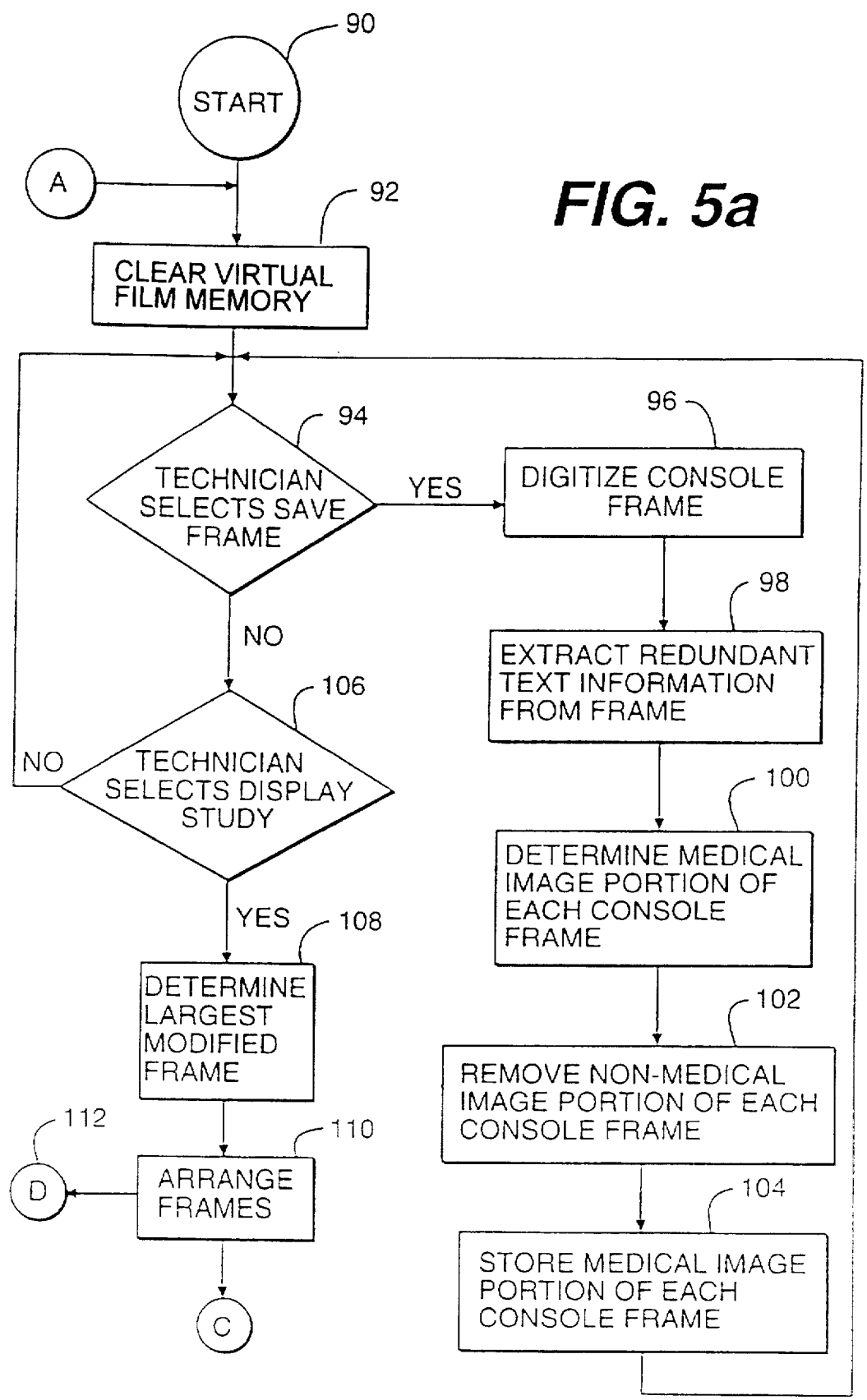
FIGS. 5a and 5b are a flow chart of the steps in maximizing the number of radiological images printed on a sheet of film according to the present invention.
Figure 5B:
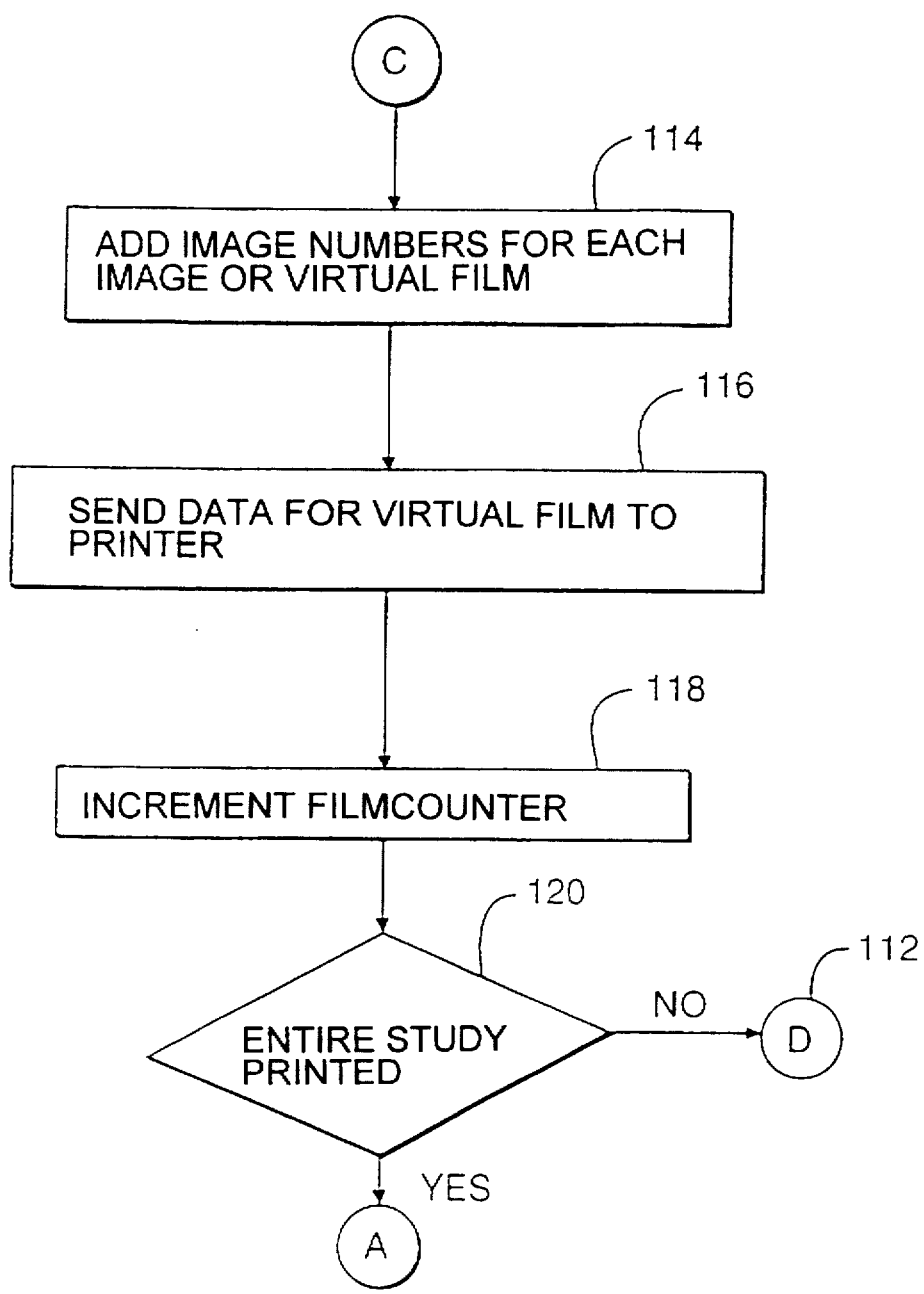

The exemplary embodiment of the method of maximizing the number of radiological images printed on a sheet of film of the present invention is shown by flowchart in FIGS. 5a and 5b.

As embodied herein and referring to FIGS 5a and 5b, the method for maximizing the number of radiological images printed on a sheet of film includes the initial step 90 of starting the individual radiological study.

At step 92, the operator of the radiological equipment clears the memory of the apparatus. The operator then reviews on the monitor 74 a particular radiological frame from the radiological device 70 and decides if that particular frame should be saved at step 94. If the operator decides that the radiological frame should not be saved, the next step, 106 is to determine if the entire study is ready to be printed. If the study is not ready to be printed, the operator then reviews the next frame in the radiological study 94.

If, however, at step 94 the operator selects a particular radiological frame to be saved, the particular radiological frame is next digitized, 96 by the digital converter 76. The digital radiological frame is then analyzed in step 98 to extract redundant textual patient information from the frame. In step 100, the digital radiological frame is analyzed to determine the medical image portion of the frame. A modified radiological frame is then created at step 102, by reducing the non-image portion of the radiological frame. The modified radiological frame is then stored at step 104.

Once the modified radiological frame is stored, the operator begins the selection process again, 94, (i.e. reviews the next frame from the radiological equipment to determine if said frame should be saved and printed). After the technician has collected and saved a sufficient plurality of radiological frames, the technician will determine at step 106 that the plurality of frames should be printed and in which reformatting arrangement they will be printed (see step 110).

Once the collection of radiological frames have been selected for printing, the largest modified radiological frame is determined, step 108. The next step, 110, is to arrange the modified radiological frames into a selected virtual film sheet arrangement. A virtual film sheet arrangement represents the arranged modified radiological frames into an area which represents an area of a selected film sheet size and depend upon which reformatting arrangement is selected in step 106. Three embodiments of virtual film sheet arrangements are detailed in FIGS. 9, 10 and 11. Three corresponding embodiments of the substep of arranging the frames 110 are illustrated in FIGS. 6, 7 and 8. Which embodiment is followed depends upon which reformatting arrangement the operator selects in step 106. These embodiments are shown and described for illustrative purposes only and the invention is not limited to the specific virtual film sheet arrangements shown and described.

Again referring to FIGS. 5a and 5b, after being arranged onto a virtual film sheet arrangement, the digital information representing the virtual film sheet arrangement of modified radiological frames and other information is forwarded to a printer or other outlet means 86. If the collection of modified radiological frames concludes the radiological study, the process is complete. If the study is not concluded, however, the process returns to step 112 in the flow charts shown in FIGS. 6, 7 or 8 depending upon which reformatting arrangement was selected in step 106.

Figure 6A:
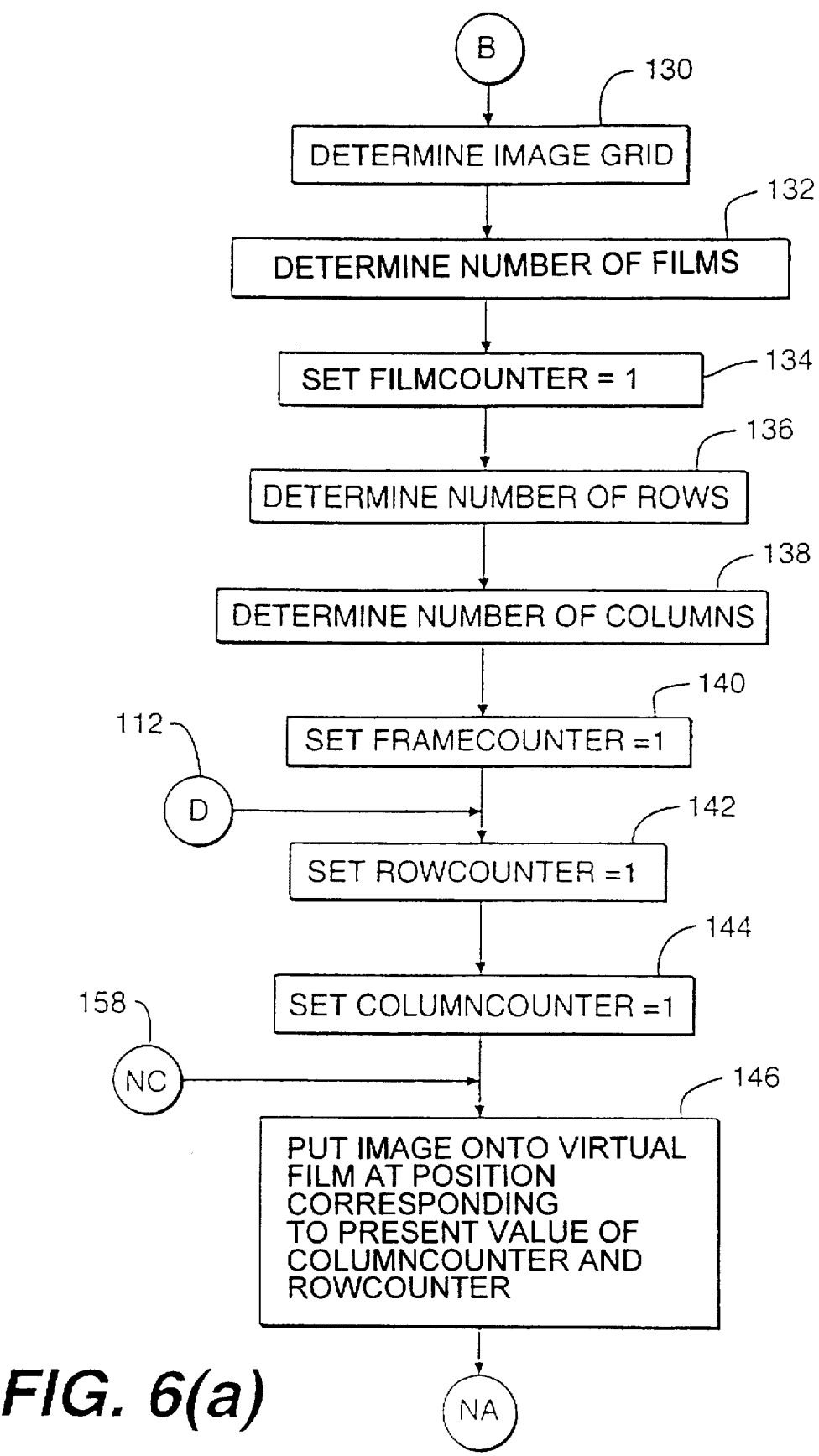
FIGS. 6a, 6b and 6c are a flow chart of the substeps of arranging the modified radiological frames according to a first embodiment of the present invention.
Figure 6B:
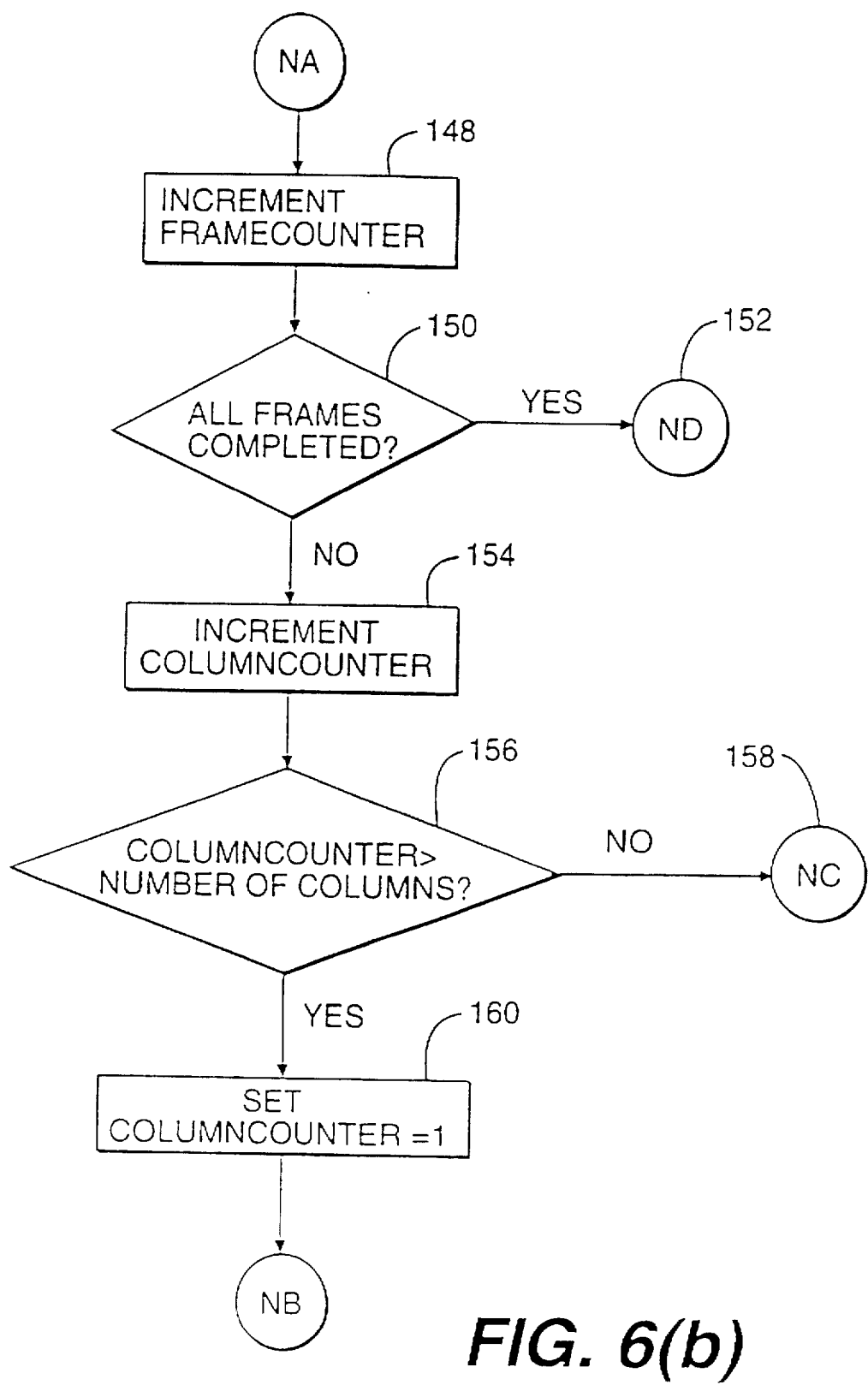
Figure 6C:
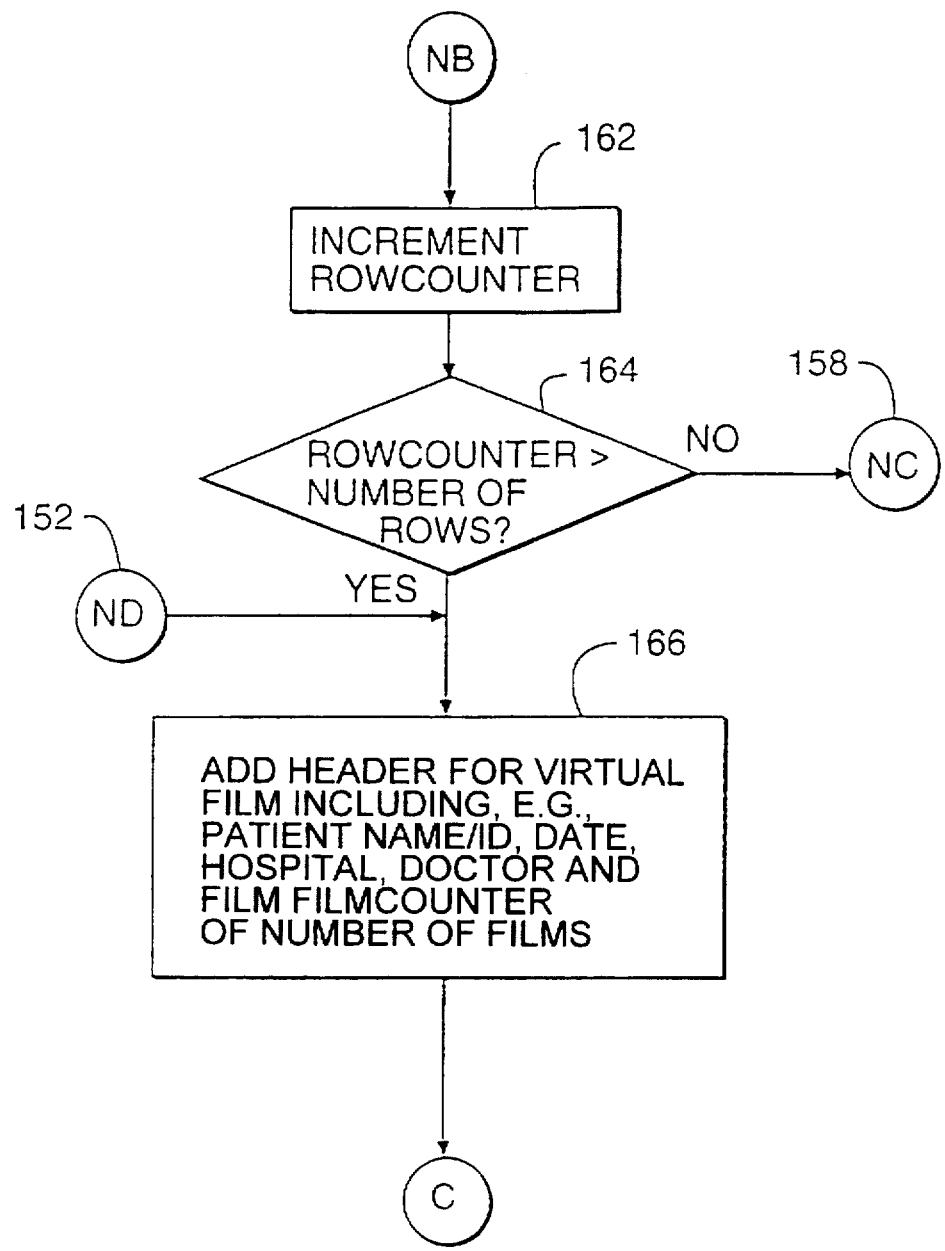

An exemplary embodiment of the substep of arranging the modified radiological frames is shown by flowchart in FIGS. 6a, b, c. The initial step, 130, is to determine which type of arrangement of modified radiological frames the operator wishes to produce. Step 132 determines the number of sheets of virtual film sheets required to output the radiological study. This number will depend upon the number of modified radiological frames, as well as the size of the modified radiological frames and the selected size of the virtual film sheet (which represents the ultimate size of the radiological film sheets onto which the modified frames will be printed). Step 134 sets the film sheet counter at 1. Step 136 determines the number of rows of modified radiological frames. Step 138 determines the number of columns of modified radiological frames on a particular virtual film sheet. Next, in step 140, the frame counter is set equal to 1. In step 142 and 144, the row counter and column counter are set to 1, respectively.

In step 146, the modified radiological frame which is being analyzed is positioned onto the virtual film sheet at the position corresponding to the present value of the column and row counters. Next, in step 148, the frame counter is incremented.

If all modified radiological frames have been positioned, the operation skips to step 112 in the flow charts shown in FIGS. 6, 7, or 8 depending upon which reformatting arrangement was selected in step 106. If the arrangement operation is not completed, however, the column counter is incremented, 154. If the column counter number is then greater than the number of columns (see step 138), the column counter is set back to 1 at block 144. If not, 158, the operation returns to step 146, positioning the next modified radiological frame at the appropriate column/row position.

After the column counter is reset to 1 at block 160, the row counter is incremented by 1 at block 162. Then, if the row counter is greater than the number of rows (step 136), thus indicating that the area representing the film sheet has been filled, the new textual portion 52 or header for the virtual film sheet is added at block 166. This header may include, but is not limited to, such information as the patient name, ID number, date, hospital and doctor information. The header will also include a film counter number and a total number of film sheets.

As an example, in FIG. 2, much of the header information 52 is taken from the redundant textual material 24, 34, 38, 44 included in the non-image portion of the unmodified frames 20, 32, 42, and 50 in FIG. 1.

If the row counter is not greater than the number of rows at block 158, the operation returns to step 146, positioning the next:

modified radiological frame at the appropriate column/row position.

Figure 7A:
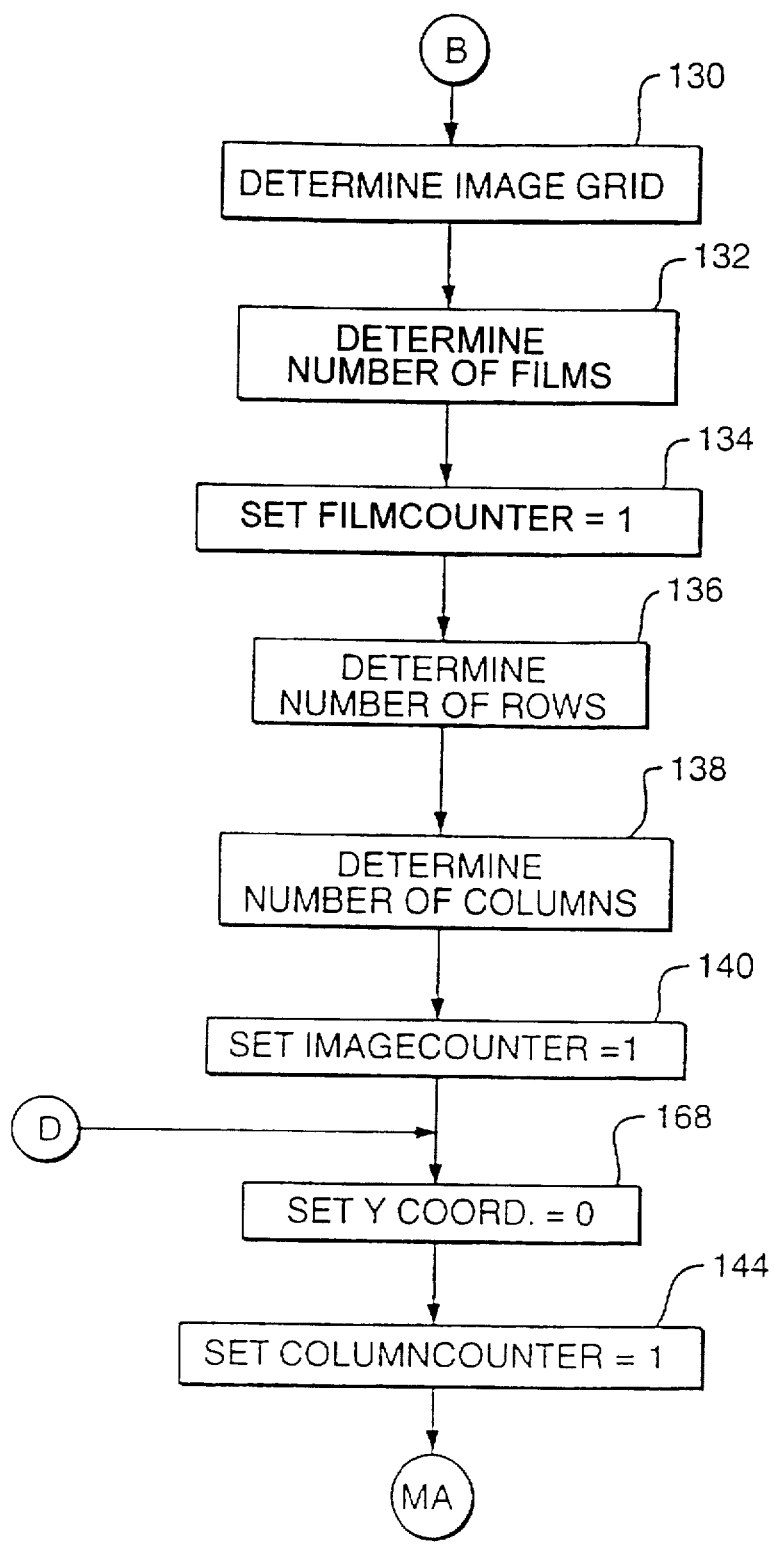
FIGS. 7a, 7b, and 7c are a flow chart of the substeps of arranging the modified radiological frames according to a second embodiment of the present invention.
Figure 7B:
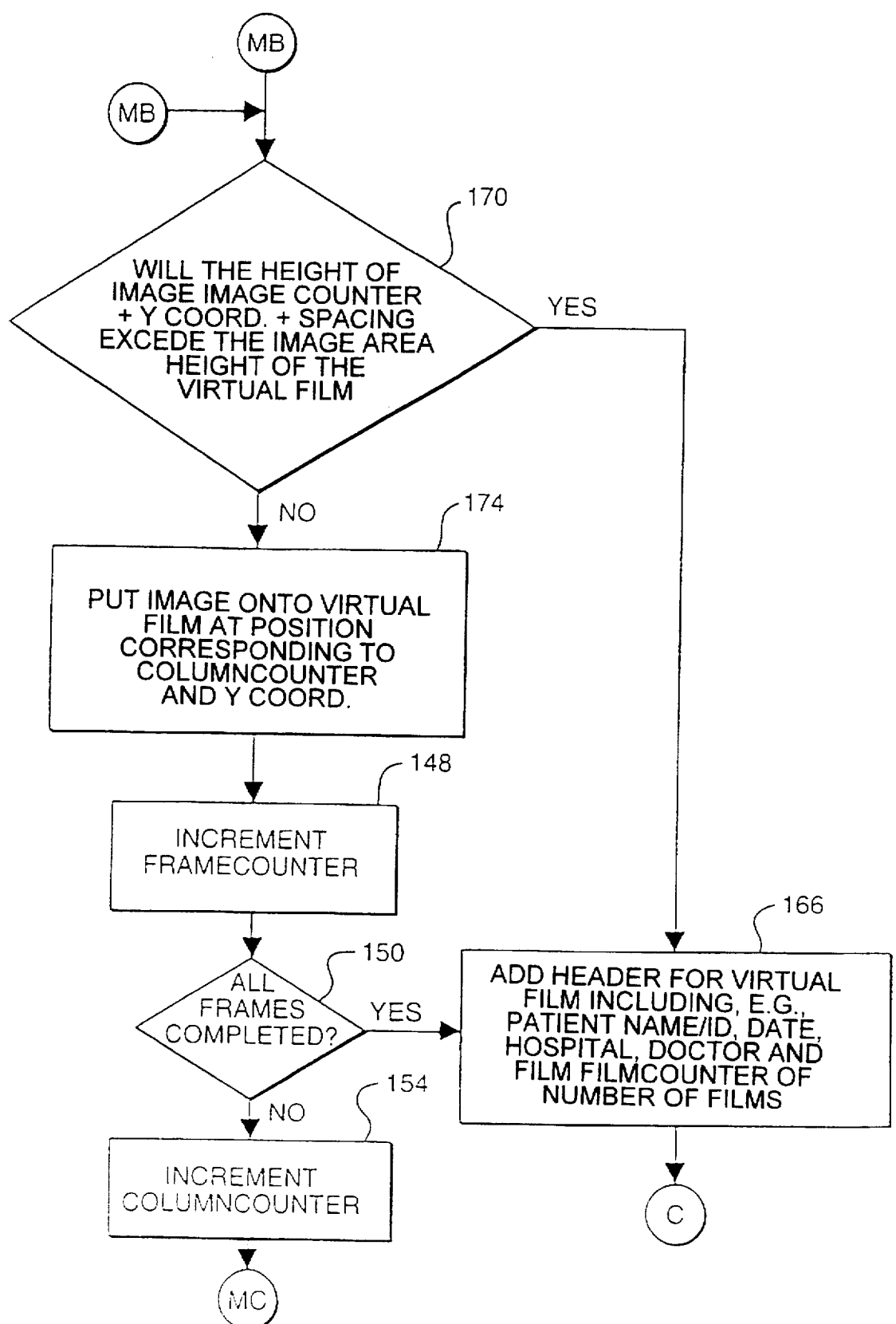
Figure 7C:
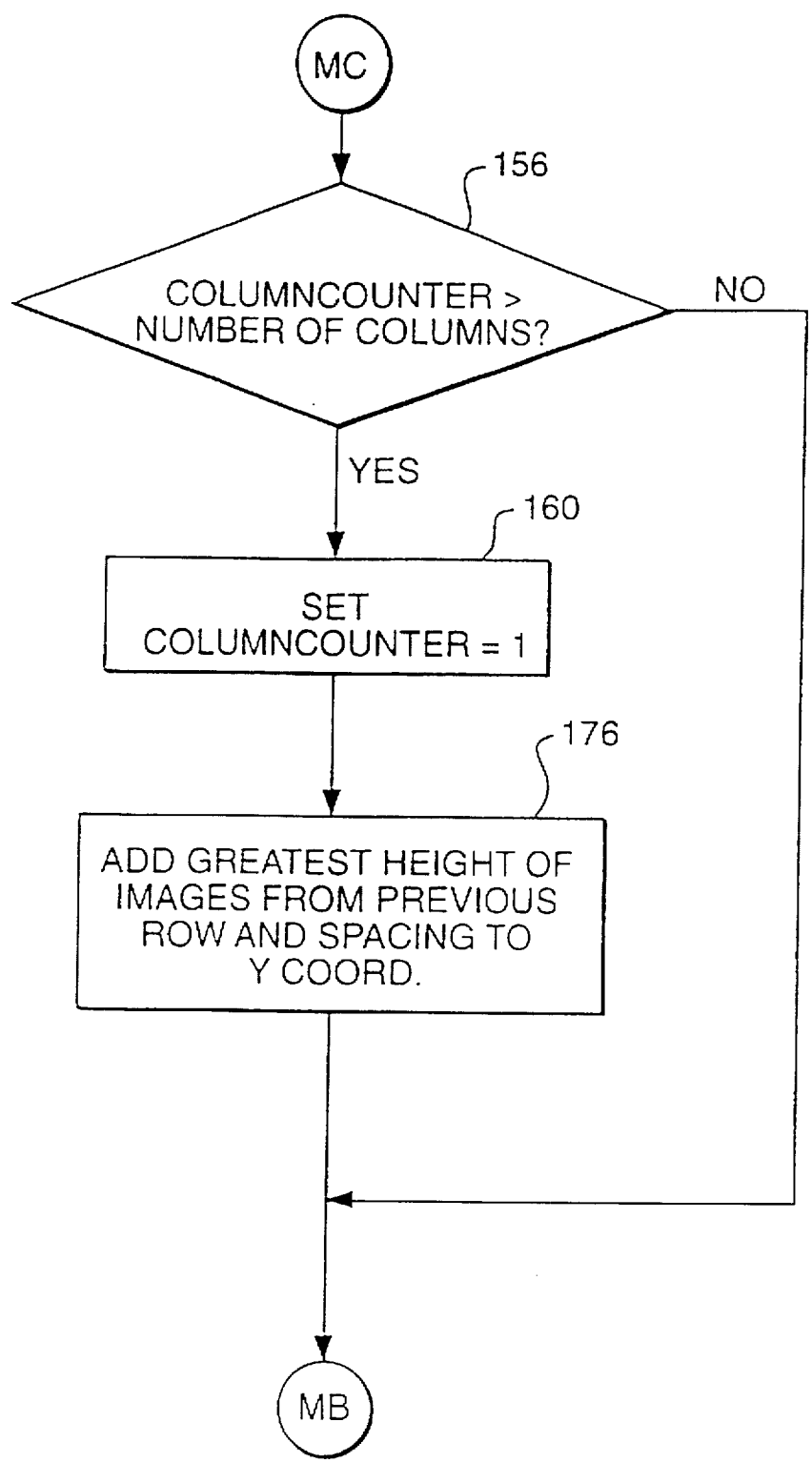

A second embodiment of the substep of arranging the radiological frames 110 will now be described where like or similar steps are identified throughout the drawings by the same reference characters. A flowchart representing the second embodiment of the substep of arranging the frames 110 is shown in FIGS. 7a, 7b, 7c. The initial six steps shown in FIG. 7a, (i.e. steps 130, 132, 134, 136, 138, 140) are the same as shown and described in FIG. 6(a).

After the image counter is set to 1 at block 140, in the second embodiment the Y coordinate is set to 0 at block 168.

Next, the column counter is set to 1 at block 144. The next decision step, 170, determines whether the modified length of the modified radiological frame being positioned, plus the present value of the Y coordinate, plus any extra-frame spacing or border values exceeds the length of the virtual film sheet. If yes as indicated at block 172, the header information for the virtual film sheet is added to the virtual film sheet at step 166.

If not, however, the particular modified radiological frame is positioned on the virtual film at the coordinates of the column counter and Y coordinate at 174. The frame counter is then incremented at 148. Next at block 150 it is determined whether all modified frames have been positioned indicating that all of the modified radiological frames from the radiological study have been positioned on virtual film sheets. If yes, the header is added to the virtual film at block 166. If not, the column counter is incremented at 154.

After the column counter is incremented, it is determined whether the column counter value is greater than the number of columns for the virtual film at 156. If so, the column counter is reset to 1 at block 160. If not, the system returns to step 170, and the process starts all over again for the next modified radiological frame to be positioned.

If, however, the column counter value is greater than the number of columns for a virtual film sheet the column counter is reset to 1 at block 160.

The modified radiological frames from the row that has just been positioned on the virtual film sheet are then analyzed to determine the largest modified length of those modified radiological frames. This value and the appropriate extra-frame spacing or border value, is then added to the Y coordinate at block 176. Next, it is again determined whether the modified length of the modified radiological frame being positioned, plus the present value of the Y coordinate, plus the spacing value will exceed the length available on the virtual film sheet at 170. If yes, the arrangement is complete for the virtual film sheet and the header information is added at step 166 and the arrangement o:E frames (step 110) is complete for that sheet. If not, the radiological frame is positioned at step 174 as discussed above.

Figure 8A:
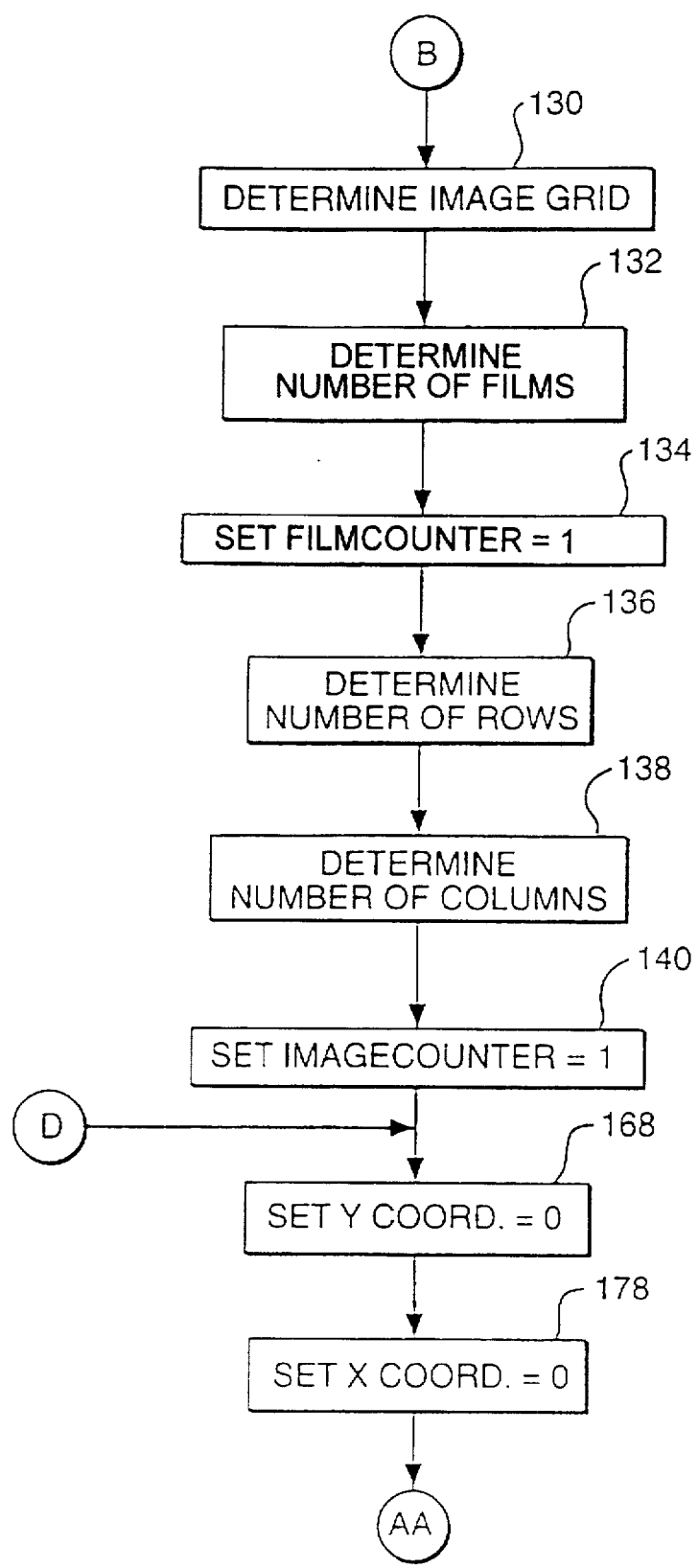
FIGS. 8a, 8b, and 8c are a flow chart of the substeps of arranging the modified radiological frames according to a third embodiment of the present invention.
Figure 8B:
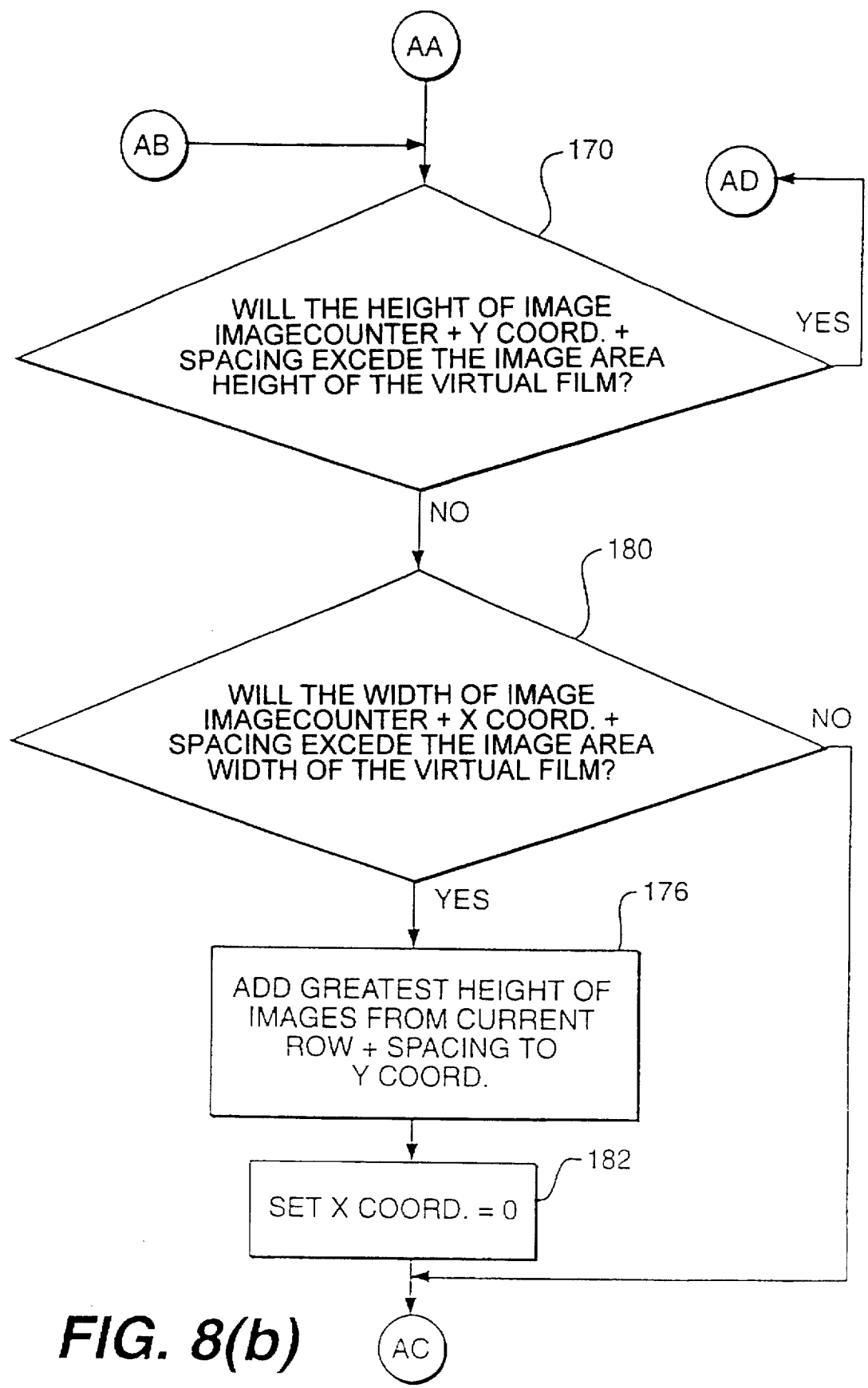
Figure 8C:
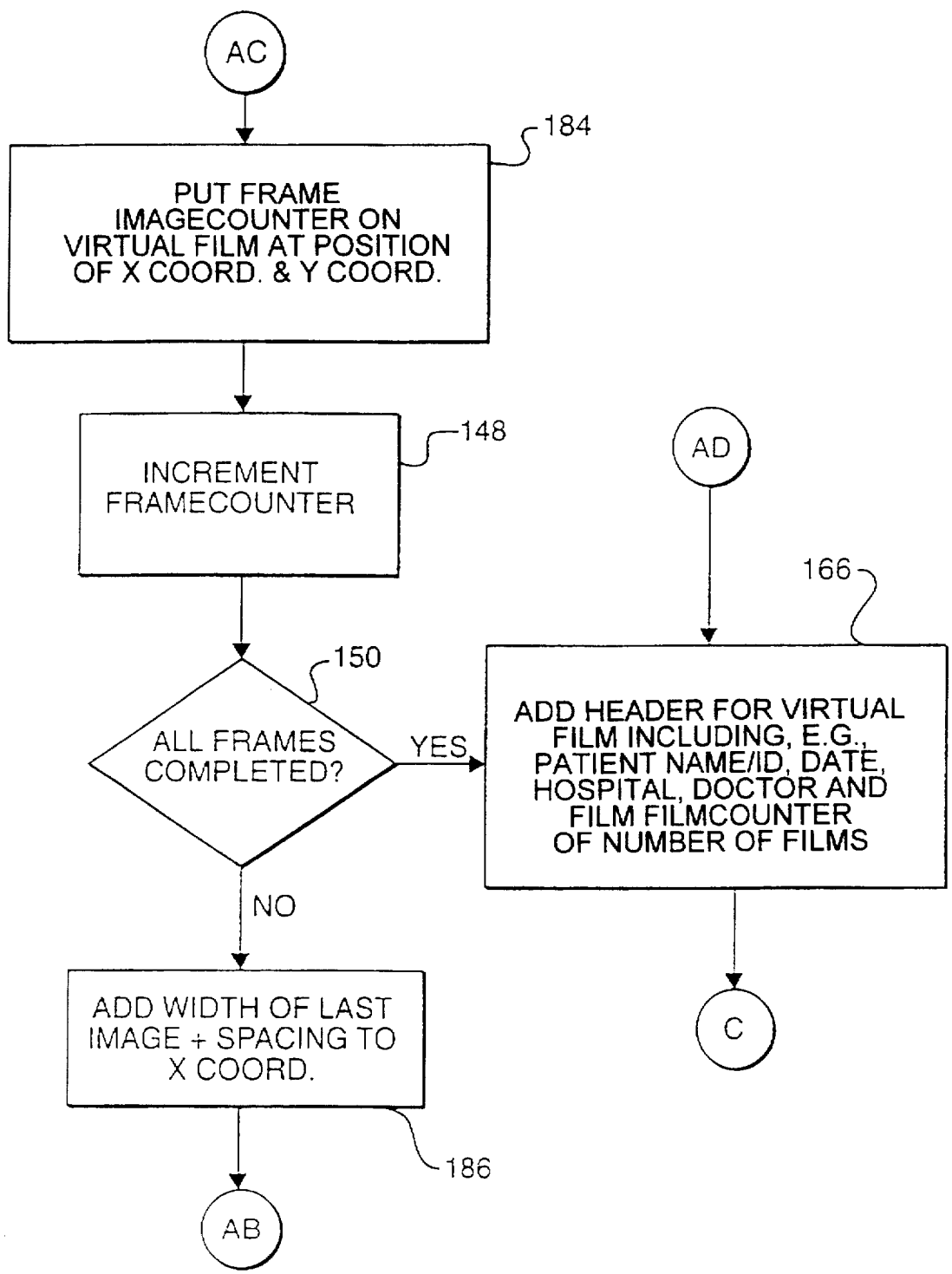

The third embodiment of the arrangement of the modified radiological frames is shown in FIGS. 8(a), 8(b), and 8(c). The first seven steps shown in FIG. 8(a) are the same as those shown in FIG. 7a. After the Y coordinate is set to 0 at 168, the X coordinate is set to 0 at 178. It is then determined whether the length of the modified radiological frame being positioned, plus the present value of the Y coordinate, plus any extra-frame spacing or border values exceeds the length of the virtual film sheet at 170. If not, it must then be determined whether the modified width of the modified radiological frame being positioned plus the present value of the X coordinate, plus any extra-frame spacing or border value will exceed the width of the virtual film sheet at block 180.

If, however, the modified length of the modified radiological frame being positioned plus the present value of the Y coordinate, plus any spacing or border value exceeds the length of the virtual film sheet, the header is added at 166.

If, the width of the modified radiological frame being positioned plus the present value of the X coordinate plus any spacing or border value exceeds the width of the virtual film sheet, the modified radiological frames for the current row are analyzed and the greatest length of the modified frames plus spacing or border is added to the Y coordinate at block 176.

Next, the X coordinate is reset to 0 at 182. The modified radiological frame being positioned is then positioned at the present value of the X coordinate and the present value of the Y coordinate at 184. Next, the frame counter is incremented by 1 at: 148. It is then determined if all images have been arranged at 150. If yes, the arrangement is complete for the virtual film sheet and the header information is added at step 166 and the arrangement of frames (step 110) is complete for that sheet. If not, the width of the previously positioned modified frame, plus only extra-frame spacing or borders is added to the X coordinate at 186.

It is then again determined whether or not the length of the modified radiological frame being positioned plus the Y coordinate, plus any extra-frame spacing or border value exceeds the image area length of the virtual film at block 170.

Figure 11:
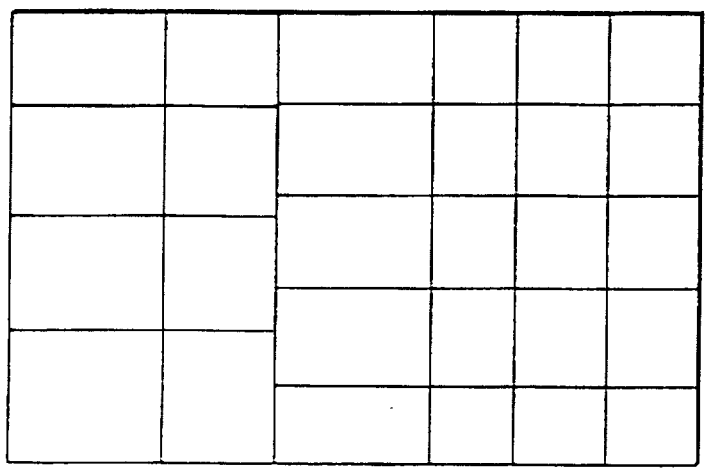
FIG. 11 is a schematic view of radiological frames arranged on a single sheet of film with the benefit of the third embodiment of the present invention.
Figure 10:
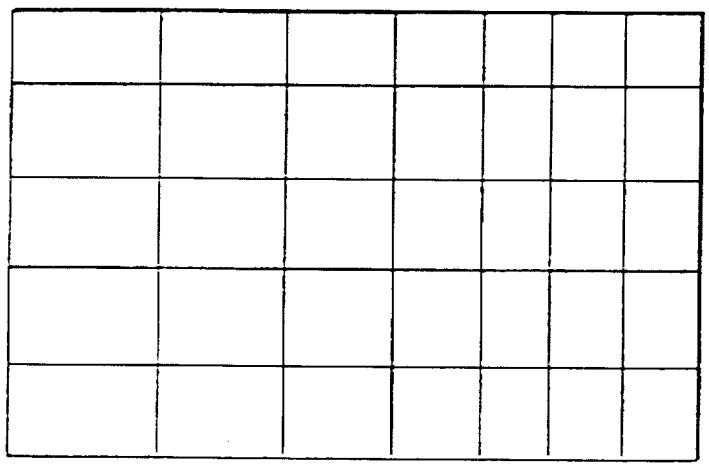
FIG. 10 is a schematic view of radiological frames arranged on a single sheet of film according to the second embodiment of the present invention.
Figure 9:
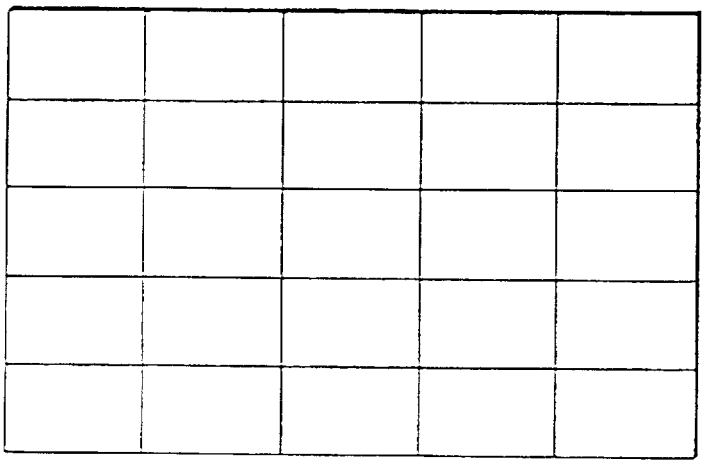
FIG. 9 is a schematic view of radiological frames arranged on a single sheet with the benefit of the first embodiment of the present invention.

FIGS. 9–11 represents various arrangements of modified radiological frames within a predetermined area corresponding to the area of a sheet of film. FIG. 9 is a schematic drawing showing the modified radiological frames arranged relative to one another into a plurality of rows and columns with each modified frame having the same modified length and width. The flow chart corresponding to the arrangement of modified radiological prints shown in FIG. 9 is depicted in FIG. 6.

Similarly, FIG. 10 is a schematic view showing modified radiological frames arranged in a plurality of rows and columns occupying a predetermined area corresponding to the area of a sheet of film such that the modified radiological frames all have the same modified width and wherein each of the modified radiological frames in a particular row have the same modified length. A flow chart corresponding to the schematic view shown in FIG. 10 is depicted in FIG. 7.

Finally, FIG. 11 is a schematic view showing modified radiological frames in a predetermined area corresponding to the area of a sheet of film such that all of the modified radiological frames arranged relative to one another in a particular row have the same modified width and the same modified length. A flow chart corresponding to the schematic view of modified radiological frames shown in FIG. 11 is depicted in FIG. 8.

It will be apparent to those skilled in the art that various modifications and variations can be made to the arrangement of thus modified radiological frames of the present invention and in the construction of the apparatus for storing the non-modified radiological frames, identifying the radiological image portion of the frames, reducing the non-image portion of the radiological frames so as to create the modified radiological frames, and arranging the modified radiological frames relative to one another without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method of maximizing the number of radiological images printed on a sheet of film, which comprises the steps of:

serially storing a plurality of digital radiological frames made up of digital information, with each said plurality of stored digital radiological frames having an image portion and a non-image portion;

identifying the radiological image portion of each said plurality of stored digital radiological frames;

reducing the non-image portion of each stored digital radiological frame so as to create a plurality of modified radiological frames each having a modified length and a modified width;

arranging the plurality of modified radiological frames relative to one another into a plurality of rows and columns of modified radiological frames occupying a predetermined area corresponding to the area of the sheet of film; and printing the arranged plurality of modified radiological prints on the sheet of film;

said step of identifying the image portion of each said plurality of stored digital frames comprising the sub steps of:

determining the outer boundaries of each said plurality of stored digital radiological frames; and analyzing, line-by-line digital information parallel to each of the outer boundaries of each said plurality of stored digital radiological frames until said analysis detects the radiological image.

2. The method as defined by claim 1, wherein said step of reducing the non-image portion of each of said plurality of stored digital radiological frames comprises the step of:

realigning one or more of the outer boundaries of each of said plurality of stored digital radiological frames for positioning said one or more outer boundaries closer to the image portion of each of said plurality of stored digital radiological frames.

3. A method of maximizing the number of radiological images printed on a sheet of film, which comprises the steps of:

serially storing a plurality of digital radiological frames made up of digital information, with each said plurality of stored digital radiological frames having an image portion and a non-image portion, the non-image portion of each of said plurality of digital radiological frames including textual information;

identifying the radiological image portion of each said plurality of stored digital radiological frames;

reducing the non-image portion of each stored digital radiological frame so as to create a plurality of modified radiological frames each having a modified length and a modified width;

removing redundant textual information from the plurality of digital radiological frames concurrently with the reducing of the non-image portion of each stored digital radiological frames;

arranging the plurality of modified radiological frames relative to one another into a plurality of rows and columns of modified radiological frames occupying a predetermined area corresponding to the area of the sheet of film; and printing the arranged plurality of modified radiological prints on the sheet of film.

* * * * *